(12) United States Patent
Mercx et al.

(10) Patent No.: US 8,496,854 B2
(45) Date of Patent: Jul. 30, 2013

(54) POSITIVE TEMPERATURE COEFFICIENT MATERIALS WITH REDUCED NEGATIVE TEMPERATURE COEFFICIENT EFFECT

(75) Inventors: Franciscus Petrus Maria Mercx, Bergen op Zoom (NL); Sascha Ter Horst, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 110 days.

(21) Appl. No.: 12/914,497

(22) Filed: Oct. 28, 2010

(65) Prior Publication Data

US 2011/0297891 A1 Dec. 8, 2011

Related U.S. Application Data

(60) Provisional application No. 61/256,350, filed on Oct. 30, 2009.

(51) Int. Cl.
H01B 1/00 (2006.01)
H01B 1/02 (2006.01)
H01B 1/04 (2006.01)
H01C 7/10 (2006.01)

(52) U.S. Cl.
USPC ........... 252/500; 252/502; 252/512; 338/22 R

(58) Field of Classification Search
USPC .............................. 252/500–521.6; 338/22 R
See application file for complete search history.

(56) References Cited

U.S. PATENT DOCUMENTS

| | | | |
|---|---|---|---|
| 4,534,889 A | 8/1985 | van Konynenburg et al. | |
| 4,560,498 A | 12/1985 | Horsma et al. | |
| 4,910,389 A * | 3/1990 | Sherman et al. | 219/548 |
| 5,106,538 A | 4/1992 | Barma et al. | |
| 6,299,801 B1 * | 10/2001 | Handa et al. | 252/511 |
| 6,620,343 B1 * | 9/2003 | Blok et al. | 252/511 |
| 7,041,238 B2 | 5/2006 | Kim et al. | |
| 8,003,016 B2 * | 8/2011 | Mercx et al. | 252/511 |
| 2003/0031438 A1 | 2/2003 | Kambe et al. | |
| 2003/0059366 A1 | 3/2003 | Venigalla et al. | |
| 2004/0009351 A1 | 1/2004 | Venigalla et al. | |
| 2004/0151892 A1 | 8/2004 | Holl et al. | |

FOREIGN PATENT DOCUMENTS

| | | |
|---|---|---|
| EP | 38718 A1 * | 10/1981 |
| EP | 0949639 A1 | 10/1999 |
| GB | 1457157 A | 12/1976 |
| WO | 89/12308 A1 | 12/1989 |
| WO | 95/01642 A1 | 1/1995 |
| WO | 96/37543 A1 | 11/1996 |

(Continued)

OTHER PUBLICATIONS

Heat Deflection Temperature Testing of Plastics; MatWeb, Material Property Data; http://www.matweb.com/reference/deflection-temperature.aspx., 2 pages (downloaded Jan. 15, 2013).

(Continued)

*Primary Examiner* — Mark Kopec
*Assistant Examiner* — Jaison Thomas
(74) *Attorney, Agent, or Firm* — Cantor Colburn LLP

(57) ABSTRACT

Positive temperature coefficient (PTC) compositions having a reduced negative temperature coefficient effect (NTC) are provided that are achieved without crosslinking the thermoplastic base material. The PTC compositions include a thermoplastic base resin, an electrically conductive filler and particles of a polymeric additive dispersed in the PTC composition.

13 Claims, 3 Drawing Sheets

FOREIGN PATENT DOCUMENTS

| | | |
|---|---|---|
| WO | 00/25325 A1 | 5/2000 |
| WO | 01/09905 A2 | 2/2001 |
| WO | 2005048273 A2 | 5/2005 |

OTHER PUBLICATIONS

Dow Amplify (TM) EA 101 Ethylene-ethyl Acrylate (EEA); MatWeb, Material Property Data, www.matweb.com/search, 2 pages (downloaded Jan. 15, 2013).

M. Narkis et al.; "Effect of Crosslinking on Carbon Black/Polyethylene Switching Materials", Journal of Applied Polymer Science, 1990, vol. 25, pp. (4).

M. Narkis et al.; "Electrical Properties of Carbon Black Filled Crosslinked Polyethylene", Polymer Engineering and Science, Nov. 1981, vol. 21, No. 16, pp. (6).

Hwan-Man Park et al.; "Exfoliated Graphite Nanoplatelet (xGnP) /Polypropylene Nanocomposites", www.speautomotive.nanocomposites-part2-paper2-park-msu-pdf-d326126841, 9 pages (downloaded Jan. 15, 2013).

L. Rejon et al.; "Percolation Phenomena in Carbon Black-Filled Polymeric Concrete", Polymer Engineering and Science, Sep. 2000, vol. 40, No. 9, pp. (4).

Weihua Di et al.; "Positive-Temperature-Coefficient/Negative-Temperature-Coefficient Effect of Low-Density Polyehtylene Filled with a Mixture of Carbon Black and Carbon Fiber", J. Polym Science Part B: Polym Phys. 2003, vol. 21, pp. 3094-3101.

M. Narkis et al.; "Resistivity Behavior of Filled Electrically Conductive Crosslinked Polyethylene", Journal of Applied Polymer Science, 1984, vol. 29, pp. 1639-1652.

\* cited by examiner

POSITIVE TEMPERATURE COEFFICIENT MATERIALS WITH REDUCED NEGATIVE TEMPERATURE COEFFICIENT EFFECT

CROSS REFERENCE TO RELATED APPLICATIONS

The present application claims priority to U.S. Provisional Patent Application No. 61/256,350 filed Oct. 30, 2009, which is hereby incorporated by reference in its entirety.

FIELD OF THE INVENTION

The present invention relates to positive temperature coefficient compositions, articles of manufacture that include a positive temperature coefficient composition, and methods of making articles that include a positive temperature coefficient composition. In particular, the present invention relates to positive temperature coefficient compositions that have a reduced negative temperature coefficient effect.

BACKGROUND OF THE INVENTION

It is known that polymers can be made electrically conductive by dispersing therein suitable amounts of conductive particulate fillers such as carbon black or fine metal particles. Over recent years, there has been particular interest in such compositions that exhibit positive temperature coefficient (PTC) characteristics, i.e., which show a very rapid increase in resistivity over a particular temperature range.

PTC materials are conductive materials characterized by a sharp increase in resistivity upon reaching a switching temperature (Ts). If the jump in resistivity is sufficiently high, the resistivity effectively blocks the current and further heating of the material such that overheating of the material is prevented. One of the main benefits of PTC materials is that no additional electronic circuits are necessary in an article that includes a PTC material since the PTC material itself has a characteristic similar to electronic circuits. Moreover, upon cooling, the material resets itself. This jump in resistivity may oftentimes be referred to as the PTC amplitude and may be defined as the ratio of the maximum volume resistivity to the volume resistivity at room temperature (app. 23° C.).

FIG. 1 is an exemplary depiction of the behavior of an electrically conducting polymeric PTC composition when subjected to a change in temperature. FIG. 1 depicts the changes in electrical resistivity when the material is subjected to a change in temperature. The electrical resistivity increases from the bottom to the top of the y-axis. As can be seen at the switching temperature $T_s$, there is a change in resistivity of several orders of magnitude. The switching temperature is indicated by the letter (A) in FIG. 1. At temperatures lower than the switching temperature, the resistivity of the polymeric composition does not change very much with a change in temperature (region 1). The slope of the resistivity curve prior to the switching temperature is referred to in FIG. 1 as the first slope. At temperatures greater than the switching temperature, there is an increase in the electrical resistivity of several orders of magnitude with temperature (region 2). This is referred to as the second slope. The switching temperature (A) is defined as the intersection of a tangent taken to the first slope with a tangent taken to the second slope. After the resistivity has increased rapidly with temperature, a maximum in resistivity is reached. The PTC amplitude is often defined as the ratio of the maximum volume resistivity to the volume resistivity at room temperature (app. 23° C.). Another way to express the PTC effect is defining the volume resistivity at a certain temperature X divided by the room temperature resistivity ($R_{X° C.}/R_{23° C.}$). As the temperature is raised further, however, often the electrical resistivity of the polymeric composition drops with temperature (region 3). The electrically conducting polymer composition now displays a negative temperature coefficient of resistance (NTC). This change from PTC behavior to a strong NTC behavior is often undesirable. There have been several theories put forth to explain both the PTC and the NTC effect. Polymeric PTC composites are based on semi-crystalline polymers and conducting fillers whose concentration is just above the percolation threshold. The mechanism for the PTC anomaly in semi-crystalline polymers is attributed to the relatively large change in specific volume of the polymer at the onset of melting. Due to this volume expansion stresses are generated resulting in displacement of part of the conductive fillers thereby disrupting the conductive chains. In addition and due to increased amorphous volume, the concentration of conductive particles effectively decreases. Both factors result in a sharp increase in resistivity. With increasing temperature the mobility of the conductive fillers increase, resulting in a reconnection of the conductive fillers opposing the initial contact loss and PTC effect and leading to a Negative Temperature Coefficient (NTC) effect on the resistivity.

PTC materials have been utilized in self-controlled heaters. When connected to a power source, the PTC material will heat up to the trip temperature and maintain this temperature without the use of any additional electronic controllers.

Compositions exhibiting PTC behavior have also been used in electrical devices as over-current protection in electrical circuits comprising a power source and additional electrical components in series. Under normal operating conditions in the electrical circuit, the resistance of the load and the PTC device is such that relatively little current flows through the PTC device. Thus, the temperature of the device remains below the critical or trip temperature. If the load is short circuited or the circuit experiences a power surge, the current flowing through the PTC device increases greatly. At this point, a great deal of power is dissipated in the PTC device. This power dissipation only occurs for a short period of time (fraction of a second), however, because the power dissipation will raise the temperature of the PTC device to a value where the resistance of the PTC device has become so high, that the current is limited to a negligible value. The device is said to be in its "tripped" state. The negligible or trickle through current that flows through the circuit will not damage the electrical components which are connected in series with the PTC device. Thus, the PTC device acts as a form of a fuse, reducing the current flow through the short circuit load to a safe, low value when the PTC device is heated to its critical temperature range. Upon interrupting the current in the circuit, or removing the condition responsible for the short circuit (or power surge), the PTC device will cool down below its critical temperature to its normal operating, low resistance state. The effect is a resettable, electrical circuit protection device.

Various materials have been developed that show these characteristics. Among them are ceramics as well as polymer based PTC materials. One problem is that most PTC materials exhibit Negative Temperature Coefficient (NTC) characteristics immediately after the PTC characteristics. If the jump in resistivity is not sufficiently high or if the NTC effect is pronounced it means that current can start to flow again. This is unwanted and efforts have been undertaken to reduce or eliminate the NTC effect.

In polymeric PTC materials reduction of the NTC effect has been achieved by cross-linking the material. Most effective is post-crosslinking after the forming step either by gamma radiation or accelerated electrons. Cross-linking in the melt also erases the NTC effect but negatively affects the PTC amplitude. In addition, the step of cross-linking the material increases the time and production costs for manufacturing the PTC material.

Accordingly, it would be beneficial to provide a PTC material that has a reduced negative temperature coefficient effect as compared to prior art PTC materials to help reduce some of the disadvantages associated with prior art materials. It would also be beneficial to provide a PTC material that has a reduced negative temperature coefficient effect other than by cross-linking of the material.

BRIEF SUMMARY OF THE INVENTION

The present invention addresses the issues associated with the prior art by providing a positive temperature coefficient (PTC) material that has a reduced negative temperature coefficient (NTC) effect. The compositions of the present invention include a thermoplastic polymer, and at least one conductive filler. The conductive filler might be carbon black, graphite, metal fillers or conductive ceramics or combinations of these. The compositions of the present invention may also include one or more additives to improve select characteristics of the PTC compositions such that they may be used in a wide variety of applications. The PTC compositions of the present invention permit PTC materials to be designed that can be tailored to operate at different temperatures based upon the thermoplastic polymer used.

Accordingly, in one aspect, the present invention provides a positive temperature coefficient material having from 20 to 90% by weight of a thermoplastic polymer, from 10 to 60% by weight of at least one conductive filler; and from 0.1 to 20% by weight of a polymer additive; wherein the polymer additive has a melting or softening temperature greater than the melting temperature of the thermoplastic resin; wherein the polymer additive is dispersed in the positive temperature coefficient composition.

Accordingly, in one aspect, the present invention provides a positive temperature coefficient material having from 20 to 90% by weight of a thermoplastic polymer, from 10 to 60% by weight of at least one conductive filler; and from 0.1 to 20% by weight of a polymer additive; wherein the higher melting or softening temperature polymer additive has <50,000 monomer units; wherein the polymer additive is dispersed in the positive temperature coefficient composition.

In another aspect, the present invention provides a method of making a positive temperature coefficient composition including the steps of mixing from 10 to 60% by weight of at least one conductive filler with from 20 to 90% by weight of a thermoplastic polymer; and dispersing from 0.1 to 20% by weight of a polymer additive into the positive temperature coefficient composition; wherein the polymer additive has a melting or softening temperature greater than the melting temperature of the thermoplastic resin and wherein the polymer additive is dispersed in the positive temperature coefficient composition.

BACKGROUND OF THE INVENTION

DETAILED DESCRIPTION OF THE INVENTION

Figure 1:
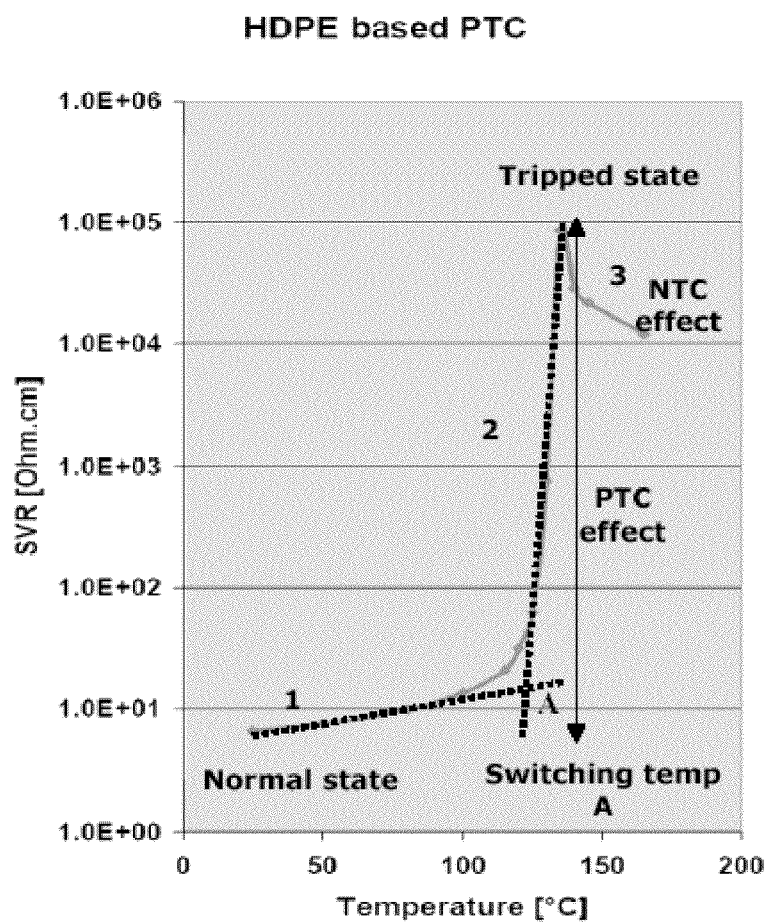
FIG. 1 shows a typical example of the resistivity of polymeric PTC materials as a function of temperature

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention provides positive temperature coefficient (PTC) materials, articles of manufacture that include one or more positive temperature coefficient materials, and methods of making articles that include one or more positive temperature coefficient materials. The PTC materials of the present invention have a reduced negative temperature coefficient effect (NTC) as compared to prior art PTC materials. As a result, the resistivity of the material does not quickly drop once the peak melting temperature of the thermoplastic base resin is reached. This effect is achieved through the use of particles of a polymeric additive that are dispersed in the PTC composition.

Accordingly, in one embodiment, the PTC compositions of the present invention provide a composition having PTC characteristics that includes a thermoplastic base resin and an electrically conductive filler. The PTC compositions of the present invention also have a reduced NTC effect achieved through the addition of particles of a polymeric additive dispersed in the PTC composition. The resulting composition is therefore capable of having a reduced NTC effect without the need for cross-linking of the thermoplastic material, which is required by prior art PTC compositions, to achieve this reduced NTC effect. Additional additives may also be used to provide additional characteristics in alternative embodiments.

As such, in one aspect, the thermoplastic compositions of the present invention use a semi-crystalline thermoplastic resin as the base for the composition. Examples of thermoplastic resins that may be used in the present invention include, but are not limited to, polyethylene (PE), including high-density polyethylene (HDPE), linear low-density polyethylene (LLDPE), low-density polyethylene (LDPE), mid-density polyethylene (MDPE), maleic anhydride functionalized polyethylene, maleic anhydride functionalized elastomeric ethylene copolymers (like EXXELOR VA1801 and VA1803 from ExxonMobil), ethylene-butene copolymers, ethylene-octene copolymers, ethylene-acrylate copolymers like ethylene-methyl acrylate, ethyelene-ethyl acrylate and ethylene butyl acrylate copolymers, glycidyl methacrylate modified polyethylene, polypropylene (PP), maleic anhydride functionalized polypropylene, glycidyl methacrylate modified polypropylene, polyvinyl chloride (PVC), polyvinyl acetate, polyvinyl acetyl, acrylic resin, syndiotactic polystyrene (sPS), polyphenylene-sulfide (PPS), polyamide-imide, polyimide, polyketones like polyetheretherketone (PEEK), polyetherketone (PEK), polyethylene vinyl acetate (EVA), glycidyl methacrylate modified polyethylene vinyl acetate, polyvinylalcohol, polyisobutylene, poly(vinylidene chloride), poly(vinylidene fluoride) (PVDF), poly(methylacrylate), polyacrylonitrile, polybutadiene, polyesters like polyethylene-terephthalate (PET), polybutylene-terephthalate (PBT), poly(8-aminocaprylic acid), poly(vinyl alcohol) (PVA), polycaprolactone, polyamides like PA6, PA66, PA6, 10, PA11 and PA12, polyphthalamide (PPA), high temperature nylon (HTN) or blends, mixtures or combinations of one or more of these polymers. In beneficial embodiments of the present invention, the thermoplastic polymer is a polyethylene polymer, such as high-density polyethylene. As used herein, a "high-density polyethylene" has a density greater than 0.94 g/cm$^3$. Thermosets can also be used, but most embodiments utilize thermoplastic material.

The amount of the thermoplastic resin used may vary depending on the presence and/or amount of other fillers as well as the type of fillers and/or polymeric additive used. In one embodiment, the thermoplastic resin is present in an amount from 20% to 90% by weight of the total weight of the composition. In an alternative embodiment, the thermoplastic resin is present in an amount from 30% to 80% by weight of the total weight of the composition.

In addition to the thermoplastic resin, the compositions of the present invention also include an electrically conducting filler. The conductive filler can include at least one ceramic filler, at least one metallic filler, at least one carbon-containing filler or a combination including at least one of the foregoing fillers. The electrically conducting filler may exist in the form of spheres, flakes, fibers, whiskers, or the like, or a combination including at least one of the foregoing forms. These electrically conducting filler may have cross-sectional geometries that may be circular, ellipsoidal, triangular, rectangular, polygonal, or a combination including at least one of the foregoing geometries. The electrically conducting filler, as commercially available, may exist in the form of aggregates or agglomerates prior to incorporation into the PTC composition or even after incorporation into the PTC composition. An aggregate includes more than one filler particle in physical contact with one another, while an agglomerate includes more than one aggregate in physical contact with one another.

As discussed, the electrically conducting filler is electrically conducting. Accordingly, in one embodiment, the electrically conducting filler has an electrical resistivity of 1 to $1 \times 10^7$ microohm-cm. In another embodiment, the electrically conducting filler has an electrical resistivity of $10$-$10^4$ microohm-cm. In yet another embodiment, the electrically conducting filler has an electrical resistivity of $10^2$-$10^4$ microohm-cm.

Conductive fillers include carbonaceous fillers such as for example carbon black, carbon nanotubes, carbon fibers and graphite, or the like, or a combination including at least one of the foregoing carbonaceous fillers. Carbon black having average particle sizes of less than or equal to 200 nm are beneficial. In one embodiment, the carbon black has an average particle sizes of less than or equal to 100 nm can be used. In another embodiment, the carbon black has an average particle sizes of greater than or equal to 40 nm can be used. Carbon nanotubes can include single wall carbon nanotubes, multi-wall carbon nanotubes, or the like. The carbon nanotubes generally have aspect ratios of greater than or equal to 2. In one embodiment, the carbon nanotubes have aspect ratios of greater than or equal to 100. In another embodiment, the carbon nanotubes have aspect ratios of greater than or equal to 1,000. The carbon nanotubes have diameters of 2 nm to 500 nm. In one embodiment, the carbon nanotubes have diameters of 5 nm to 100 nm. In one embodiment, the carbon nanotubes have diameters of 7 nm to 30 nm. Graphite fibers are generally obtained from the pyrolysis of pitch or polyacrylonitrile (PAN) based fibers. Graphite fibers having diameters of 1 micrometer to 30 micrometers and lengths of 0.5 millimeter to 2 centimeters can be used in the electrically conducting polymer composition.

Examples of suitable ceramic fillers are metal oxides, metal carbides, metal nitrides, metal hydroxides, metal oxides having hydroxide coatings, metal carbonitrides, metal oxynitrides, metal borides, metal borocarbides, or the like, or a combination including at least one of the foregoing inorganic materials. Metal cations in the foregoing ceramic fillers can be transition metals, alkali metals, alkaline earth metals, rare earth metals, or the like, or a combination including at least one of the foregoing metal cations.

Examples of suitable electrically conducting ceramic fillers are titanium diborides ($TiB_2$) tungsten carbide (WC), tin oxide, indium tin oxide (ITO), antimony tin oxide, titanium nitride (TiN), zirconium nitride (ZrN), titanium carbide (TiC), molybdenum silicide ($MoSi_2$), potassium titanate whiskers, vanadium oxides ($V_2O_3$), or a combination including at least one of the foregoing ceramic fillers.

"Metallic fillers" include metal powders, metal-coated particles, or any other conductive, metal-containing particles. Examples of suitable metal powders include tool steels, martensitic stainless steel, high-speed tool steels, stainless steel, iron, silicone chromium, silver, vanadium, tungsten, nickel, or the like, or a combination including at least one of the foregoing metals. Metal alloys can also be added to the electrically conducting polymer composition. Examples of metal alloys include tool steel, martensitic stainless steel stainless steel, neodymium iron boron (NdFeB), samarium cobalt (SmCo), aluminum nickel cobalt (AlNiCo), or the like, or a combination including at least one of the foregoing. Examples of metal-coated particles include conductive or non-conductive substrates coated with a layer of solid conductive metal such as aluminum, copper, magnesium, chromium, tin, nickel, silver, iron, titanium, or the like, or a combination including at least one of the foregoing metals may be used to coat the substrates.

The electrically conducting filler can be nanoparticles or micrometer sized particles. If the electrically conducting filler is nanoparticles it is beneficial to have an average particle size of less than or equal to 500 nm. In one embodiment, it is beneficial for the average particle size to be less than or equal to 200 nm. In another embodiment, it is beneficial for the average particle size to be less than or equal to 100 nm. In yet another embodiment, it is beneficial for the average particle size to be less than or equal to 50 nm.

If the electrically conducting filler is micrometer-sized particles then it is beneficial to have an average particle size of greater than or equal to 1 micrometer (μm). In another embodiment, it is beneficial for the average particle size to be greater than or equal to 5 μm. In yet another embodiment, it is beneficial for the average particle size to be greater than or equal to 10 μm. In another embodiment, it is beneficial for the particle sizes to be greater than or equal to 100 μm.

The amount of the conductive filler used may vary depending on the presence and/or amount of other fillers as well as the type of thermoplastic resin and/or polymeric additive used. In one embodiment, the conductive filler is present in an amount from 10% to 60% by weight of the total weight of the composition. In an alternative embodiment, the conductive filler is present in an amount from 15% to 50% by weight of the total weight of the composition.

In addition to the thermoplastic polymer and the electrically conductive filler, the compositions of the present invention include a polymeric additive that helps to reduce the NTC effect associated with prior art PTC compositions. The polymeric additive is selected such that it is capable of being dispersed in the PTC composition and the polymeric additive is chosen such that it has a higher melting or softening temperature than the melting temperature of the thermoplastic polymer of the PTC composition. Not wishing to be bound by theory, it is believed that that polymeric additive helps reduce the NTC effect in a PTC composition as the dispersed polymeric additive particles act as a solid filler at and above the PTC trip temperature thereby increasing the viscosity and limiting the mobility of the conductive fillers in the thermoplastic polymer phase thereby preventing the re-organization of the conductive fillers which is believed to be responsible for the NTC effect observed in prior art PTC materials.

Accordingly, the polymeric additive is selected from any polymer capable of being dispersed in particles within another thermoplastic material. The polymeric additive is selected such that it has a melting or softening temperature above the melting temperature of the thermoplastic polymer of the PTC composition such that the polymeric additive remains substantially in particle form and/or does not blend with the thermoplastic polymer. In one embodiment, the polymeric additive has a melting or softening temperature 10° C. or more than the melting temperature of the thermoplastic polymer of the PTC composition. In another embodiment, the polymeric additive has a melting or softening temperature 20° C. or more than the melting point of the thermoplastic polymer of the PTC composition. Examples of polymeric additives that may be used in the present invention include, but are not limited to, polyamide, such as nylon 6 or nylon 66, high temperature nylons, polyphthalamide, polyphenylene sulfide, polyesters, polyketones, polyimides, polysulfones, polycarbonate, polyphenylene ether, poly ether imide, etc.

The polymer additive selected typically has less than 50,000 monomer units. In one embodiment, the polymer additive has less than 10,000 monomer units. In another embodiment, the polymer additive has less than 1,000 monomer units. In yet another embodiment, the polymer additive has greater than 50 monomer units When processed at temperatures above the melting temperatures of this polymer additive, the overall viscosity is low enough to be able to injection molded and in fact even thin-walled molding is feasible (e.g. walls having a thickness of <1 mm). At the processing temperature the composition has a sufficiently low viscosity to be able to injection molded, but at the same time the mobility at the trip temperature and above is reduced, as the polymers added are still solid particles thereby obstructing the local mobility of the base resin chains.

In one embodiment, polyamides may be used as the polymeric additive in the PTC composition. Polyamides are generally derived from the polymerization of organic lactams having from 4 to 12 carbon atoms. Exemplary lactams are represented by the formula (I)

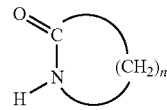

wherein n is about 3 to about 11. In one embodiment the lactam is epsilon-caprolactam having n equal to 5.

Polyamides may also be synthesized from amino acids having from 4 to 12 carbon atoms. Exemplary amino acids are represented by the formula (II)

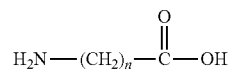

wherein n is about 3 to about 11. In one embodiment the amino acid is epsilon-aminocaproic acid with n equal to 5.

Polyamides may also be polymerized from aliphatic dicarboxylic acids having from 4 to 12 carbon atoms and aliphatic diamines having from 2 to 12 carbon atoms. Suitable aliphatic dicarboxylic acids are the same as those described above for the synthesis of polyesters hereinafter. Exemplary aliphatic diamines are represented by the formula (III)

wherein n is about 2 to about 12. In one embodiment the aliphatic diamine is hexamethylenediamine ($H_2N(CH_2)_6NH_2$). It is beneficial that the molar ratio of the dicarboxylic acid to the diamine be about 0.66 to about 1.5. Within this range it is generally beneficial to have the molar ratio be greater than or equal to about 0.81 in one embodiment and greater than or equal to about 0.96 in another embodiment. Also beneficial within this range is an amount of less than or equal to 1.22 in one embodiment and less than or equal to about 1.04 in another embodiment. Polyamides especially useful in the present invention include, but are not limited to, nylon 6, nylon 6,6, nylon 4,6, nylon 6, 12, nylon 10, or the like, or combinations comprising at least one of the foregoing polyamides.

In another embodiment, cycloaliphatic polyesters may be used as the polymeric additive in the PTC composition. Cycloaliphatic polyesters are generally prepared by reaction of organic polymer precursors such as a diol with a dibasic acid or derivative. The diols useful in the preparation of the cycloaliphatic polyester polymers are straight chain, branched, or cycloaliphatic, preferably straight chain or branched alkane diols, and may contain from 2 to 12 carbon atoms.

Suitable examples of diols include ethylene glycol, propylene glycol, i.e., 1,2- and 1,3-propylene glycol; butane diol, i.e., 1,3- and 1,4-butane diol; diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentane diol, 1,6-hexane diol, 1,4-cyclohexane dimethanol and particularly its cis- and trans-isomers, triethylene glycol, 1,10-decane diol, and mixtures of any of the foregoing. Particularly preferred is dimethanol bicyclo octane, dimethanol decalin, a cycloaliphatic diol or chemical equivalents thereof and particularly 1,4-cyclohexane dimethanol or its chemical equivalents. If 1,4-cyclohexane dimethanol is to be used as the diol component, it is generally preferred to use a mixture of cis- to trans-isomers in mole ratios of about 1:4 to about 4:1. Within this range, it is generally desired to use a mole ratio of cis- to trans-isomers of about 1:3.

The diacids useful in the preparation of the cycloaliphatic polyester polymers are aliphatic diacids that include carboxylic acids having two carboxyl groups each of which are attached to a saturated carbon in a saturated ring. Suitable examples of cycloaliphatic acids include decahydro naphthalene dicarboxylic acid, norbornene dicarboxylic acids, bicyclo octane dicarboxylic acids. Preferred cycloaliphatic diacids are 1,4-cyclohexanedicarboxylic acid and trans-1,4-cyclohexanedicarboxylic acids. Linear aliphatic diacids are also useful when the polyester has at least one monomer containing a cycloaliphatic ring. Illustrative examples of linear aliphatic diacids are succinic acid, adipic acid, dimethyl succinic acid, and azelaic acid. Mixtures of diacid and diols may also be used to make the cycloaliphatic polyesters.

Cyclohexanedicarboxylic acids and their chemical equivalents can be prepared, for example, by the hydrogenation of cycloaromatic diacids and corresponding derivatives such as isophthalic acid, terephthalic acid or naphthalenic acid in a suitable solvent, water or acetic acid at room temperature and at atmospheric pressure using suitable catalysts such as rhodium supported on a suitable carrier of carbon or alumina. They may also be prepared by the use of an inert liquid medium wherein an acid is at least partially soluble under reaction conditions and a catalyst of palladium or ruthenium in carbon or silica is used.

Typically, during hydrogenation, two or more isomers are obtained wherein the carboxylic acid groups are in either the cis- or trans-positions. The cis- and trans-isomers can be separated by crystallization with or without a solvent, for example, n-heptane, or by distillation. While the cis-isomer tends to blend better, the trans-isomer has higher melting and crystallization temperature and is generally preferred. Mixtures of the cis- and trans-isomers may also be used, and preferably when such a mixture is used, the trans-isomer will preferably include at least about 75 wt % and the cis-isomer will include the remainder based on the total weight of cis- and trans-isomers combined. When a mixture of isomers or more than one diacid is used, a copolyester or a mixture of two polyesters may be used as the cycloaliphatic polyester resin.

Chemical equivalents of these diacids including esters may also be used in the preparation of the cycloaliphatic polyesters. Suitable examples of the chemical equivalents of the diacids are alkyl esters, e.g., dialkyl esters, diaryl esters, anhydrides, acid chlorides, acid bromides, or the like, or combinations including at least one of the foregoing chemical equivalents. The preferred chemical equivalents include the dialkyl esters of the cycloaliphatic diacids, and the most preferred chemical equivalent includes the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, wherein two isomers having the carboxylic acid groups in the cis- and trans-positions are obtained. The isomers can be separated, the trans-isomer being especially preferred. Mixtures of the isomers may also be used as detailed above.

The polyester polymers are generally obtained through the condensation or ester interchange polymerization of the polymer precursors such as diol or diol chemical equivalent component with the diacid or diacid chemical equivalent component and having recurring units of the formula (IV):

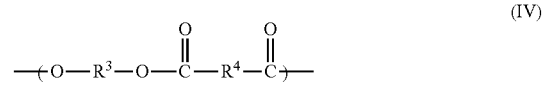

wherein $R^3$ represents an alkyl or cycloalkyl radical containing 2 to 12 carbon atoms and which is the residue of a straight chain, branched, or cycloaliphatic alkane diol having 2 to 12 carbon atoms or chemical equivalents thereof; and $R^4$ is an alkyl or a cycloaliphatic radical which is the decarboxylated residue derived from a diacid, with the proviso that at least one of $R^3$ or $R^4$ is a cycloalkyl group.

A beneficial cycloaliphatic polyester is poly(1,4-cyclohexane-dimethanol-1,4-cyclohexanedicarboxylate) having recurring units of formula (V)

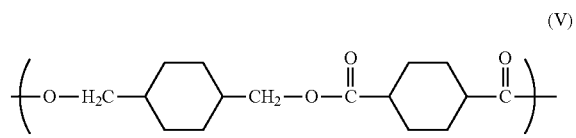

wherein in the formula (I), $R^3$ is a cyclohexane ring, and wherein $R^4$ is a cyclohexane ring derived from cyclohexanedicarboxylate or a chemical equivalent thereof and is selected from the cis- or trans-isomer or a mixture of cis- and trans-isomers thereof. Cycloaliphatic polyester polymers can be generally made in the presence of a suitable catalyst such as a tetra(2-ethyl hexyl)titanate, in a suitable amount, typically about 50 to 400 ppm of titanium based upon the total weight of the final product. Aromatic polyesters or polyarylates may also be used in the conductive compositions.

Beneficially, the number average molecular weight of the polyesters is about 3,000 to about 1,000,000 g/mole. Within this range, it is beneficial to have a number average molecular weight of greater than or equal to about 10,000, preferably greater than or equal to about 20,000, and more preferably greater than or equal to about 25,000 g/mole. Also desirable is a number average molecular weight of less than or equal to about 100,000, preferably less than or equal to about 75,000, more preferably less than or equal to about 50,000, and most preferably less than or equal to about 35,000 g/mole.

The amount of polymeric additive used in the PTC compositions is, in one embodiment, from 0.1 to 20 wt. % based on the total weight of the composition. In another embodiment, the polymeric additive is included in an amount from 1 to 15 wt. % based on the total weight of the composition. In still another embodiment, the polymeric additive is included in an amount from 1 to 10 wt. % based on the total weight of the composition.

In addition to the thermoplastic polymer and the electrically conductive filler, and the polymeric additive, the compositions of the present invention can include a compatibilizer. In one embodiment, modified polyolefins may be used as the compatibilizer in the PTC composition. The modified polyolefin may include a polyolefin resin to which an unsaturated monomer containing epoxy, carboxyl, or an acid anhydride group is copolymerized or grafted. Exemplary epoxy-containing unsaturated monomers include glycidyl methacrylate, butylglycidyl malate, butylglycidyl fumarate, propylglycidyl malate, glycidyl acrylate, N-[4-(2,3-epoxypropoxy)-3,5-dimethylbenzyl]-acrylamide, and the like. Among these, beneficial embodiments include glycidyl methacrylate and N-[4-(2,3-epoxypropoxy)-3,5-dimethylbenzyl]acrylamide. Exemplary carboxyl-containing unsaturated monomers include acrylic acid, methacrylic acid, maleic acid, and the like. Exemplary unsaturated monomers containing an acid anhydride group are maleic anhydride, itaconic anhydride, citraconic anhydride, and the like. Beneficial embodiments include acrylic acid and maleic anhydride.

The amount of compatibilizer used in the compositions is, in one embodiment, from 0.1 to 15 wt. % based on the total weight of the composition. In another embodiment, the compatibilizer is included in an amount from 1 to 10 wt. % based on the total weight of the composition. In still another embodiment, the compatibilizer is included in an amount from 1 to 6 wt. % based on the total weight of the composition.

In addition to the foregoing components, the thermoplastic compositions of the present invention further may include, in alternative embodiments, a flame retardant. In some cases it might be beneficial to add expandable graphites as synergist, permitting a reduction the loading of flame retardant. In one embodiment, the flame retardant is a phosphorus containing flame retardant, for example an organic phosphate and/or an organic compound containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis (neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

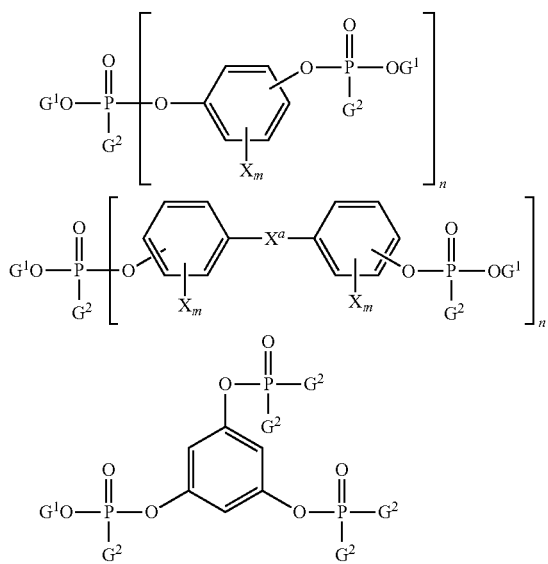

wherein each $G^1$ is independently a hydrocarbon having 1 to 30 carbon atoms; each $G^2$ is independently a hydrocarbon or hydrocarbon having 1 to 30 carbon atoms; each X is independently a bromine or chlorine; m 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A (, respectively, their oligomeric and polymeric counterparts, and the like. Methods for the preparation of the aforementioned di- or polyfunctional aromatic compounds are described in British Patent No. 2,043,083.

Other useful phosphorus containing compounds are the inorganic salts of polyphosphoric acid and ammonia, ammonium polyphosphate (APP) or polyphosphoric acid and melamine, melamine polyphosphate (MPP).

The amount of flame retardant added to the thermoplastic compositions of the present invention may be based on the type of resin, the type and/or amount of the unmodified polyolefin, the type and/or amount of the modified polyolefin, and/or the type and/or amount of any additional fillers or additives. Accordingly, in the present invention, the amount of flame retardant in the thermoplastic composition is sufficient to impart flame retardant characteristics while still maintaining a selected impact strength and/or HDT. In one embodiment, the flame retardant is added in amounts up to 30 wt. %. In another embodiment, the flame retardant is added in amounts up to 20 wt. %. In still another embodiment, the flame retardant is added in amounts up to 10 wt. %.

Optionally, inorganic flame retardants may also be used, for example sulfonate salts such as potassium perfluorobutane sulfonate (Rimar salt) and potassium diphenylsulfone sulfonate; salts formed by reacting for example an alkali metal or alkaline earth metal (preferably lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, $BaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of from 0.01 to 1.0 parts by weight, more specifically from 0.05 to 0.5 parts by weight, based on 100 parts by weight of resin, the lubricant, and the flame retardant.

In alternative embodiment, the compositions of the present invention may include one or more fillers. These fillers may be selected to impart additional impact strength and/or provide additional characteristics that may be based on the final selected characteristics of the thermoplastic compositions. Suitable fillers or reinforcing agents include, for example, $TiO_2$; fibers, such as glass fibers, carbon fibers, or the like; silicates and silica powders, such as aluminum silicate (mullite), boehmite (aluminium oxide hydroxide) in the form of needles or powders, synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); magnesium hydroxide; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, or the like, or combinations including at least one of the foregoing fillers or reinforcing agents.

The fillers and reinforcing agents may be surface treated with silanes, titanates, zirconates to improve adhesion and dispersion with the polymeric matrix resin. In addition, the fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable co woven structures include, for example, aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of from 1 to 50 parts by weight, based on 100 parts by weight of the total composition.

Lastly, the compositions of the present invention may, in alternative embodiments, include one or more additives ordinarily incorporated in resin compositions of this type. Mixtures of additives may be used. Such additives may be mixed at a suitable time during the mixing of the components for forming the composition. The one or more additives are included in the thermoplastic compositions to impart one or more selected characteristics to the thermoplastic compositions and any molded article made therefrom. Examples of additives that may be included in the present invention include, but are not limited to, heat stabilizers, process stabilizers, antioxidants, light stabilizers, plasticizers, antistatic agents, mold releasing agents, UV absorbers, pigments, dyes, colorants, flow promoters, dispersing agents or a combination of one or more of the foregoing additives.

Suitable heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Suitable antistatic agents include, for example, glycerol monostearate, sodium stearyl sulfonate, sodium dodecylbenzenesulfonate or the like, or combinations of the foregoing antistatic agents. In one embodiment, carbon fibers, carbon nanofibers, carbon nanotubes, carbon black, or any combination of the foregoing may be used in a polymeric resin containing chemical antistatic agents to render the composition electrostatically dissipative.

Suitable mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1, 3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)

oxy]-2,2-bis[[(2-cyano-3,3-diphenylacryloyl)oxy]methyl] propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 1 to 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4-trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR 5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.1 to 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.1 to 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Suitable dispersing agents include, for example, organomodified siloxanes like the Tegopren and Tegomer materials from Degussa, low-melting polymeric esters with a comb-like structure, like Armowax W-440 from Akzo Nobel.

Additionally, materials to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

The thermoplastic compositions of the present invention may be formed using any known method of combining multiple components to form a thermoplastic resin. In one embodiment, the components are first blended in a high-speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a side feeder. The extruder is generally operated at a temperature higher than that necessary to cause the composition to flow. The extrudate is immediately quenched in a water batch and pelletized. The pellets so prepared when cutting the extrudate may be one-fourth inch long or less as desired. Such pellets may be used for subsequent molding, shaping, or forming.

Shaped, formed, or molded articles including the thermoplastic compositions are also provided. The thermoplastic compositions can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, RFID applications, automotive applications, and the like.

The present invention is further illustrated by the following non-limiting examples.

EXAMPLES

The present invention will now be illustrated in more detail by reference to the following specific, non-limiting examples. Unless otherwise indicated, all percentages are by weight.

The PTC materials were compounded on a Werner and Pfleiderer 25 mm co-rotating 10-barrel twin-screw extruder. All ingredients were fed at the throat. The intake zone was set at 50° C., the first heating element at 100° C. and the second heating element at 150° C. For #4, the other heating elements as well as the die were set at 190° C. For #1, #9 and #11, the other heating elements as well as the die were set at 210° C. For the PBT (#5 and #6)-containing materials, the other heating elements as well as the die were set at 250° C. For the PA6 containing materials (formulations #10 and #12), the second heating element was set at 150° C. and the other heating elements as well as the die were set at 250° C. For the PA66 containing materials (formulations #2, #3, #7 and #8), the second heating element was set at 150° C. and the other heating elements as well as the die were set at 270° C. Typically all compositions were compounded at a screw speed of 300 rpm, the throughput was tuned in order to reach a torque of between 70 and 80 percent.

After pre-drying for 4 hrs at 80° C., the compositions were injection molded on an Engel 75 using the following settings for formulation #1, #4 and #11-hopper at 40° C., $1^{st}$ zone set at 225° C., $2^{nd}$ zone at 235° C., $3^{rd}$ zone set at 245° C. and the die at 240° C. with a mold temperature of 60° C. For the PBT and PA6 containing materials (formulations #5, #6 and #12), the following settings were used-hopper at 40° C., $1^{st}$ zone set at 240° C., $2^{nd}$ zone at 250° C., $3^{rd}$ zone set at 260° C. and the die at 255° C. with a mold temperature of 60° C. For the PA66 containing formulations (#2, #3, #7 and #8), the following settings were used-hopper at 40° C., $1^{st}$ zone set at 270° C., $2^{nd}$ zone at 275° C., $3^{rd}$ zone set at 280° C. and the die at 275° C. with a mold temperature of 60° C. The compositions were formed into ISO-tensile bars and ISO-impact bars that were then used to determine the PTC characteristics and mechanical properties of the given composition.

The PTC characteristics were measured using a "static test". Samples for the static test were prepared as follows: the ISO-tensile bars were notched at the straight mid section about 7 cm apart, cooled to −40° C. and broken, after which silver paint was applied. In the static test, a temperature was forced upon the material and the resulting resistance was measured. The equipment consists of a programmable temperature controlled oven, a special sample block and a Keithley data acquisition system to measure the resistance. The oven temperature was raised in steps of ~20° C. prior to the onset of the PTC effect and in steps of 5-10° C. just before and after the onset. Only around the PTC temperature did large changes of the resistance vs. the temperature occur. As such initially larger incremental steps in temperature were employed which, upon nearing the PTC temperature, were reduced and increased after the PTC effect had occurred. To ensure a homogeneous well-through heated sample and to get stable resistance readings, a minimum conditioning time is necessary after the oven has reached its new set point. Typically the following conditioning times were employed: 25 min in the temperature range from RT to 115° C. as well as from 140° C. upwards and 40 min from 120 to 140° C.

The effective specific volume resistivity (SVR) was measured according to:

$$SVR \text{ (Ohm.cm)} = \frac{\text{Resistance (Ohm)} * \text{Fracture Area (cm}^2\text{)}}{\text{Length of sample(electrode distance) (cm)}}$$

$R_{X°C}/R_{23°C}$ was used as a measure for the magnitude of the PTC effect, were $R_{X°C}$ denotes the resistivity at X° C. and $R_{23°C}$ the room temperature resistivity.

Figure 2:
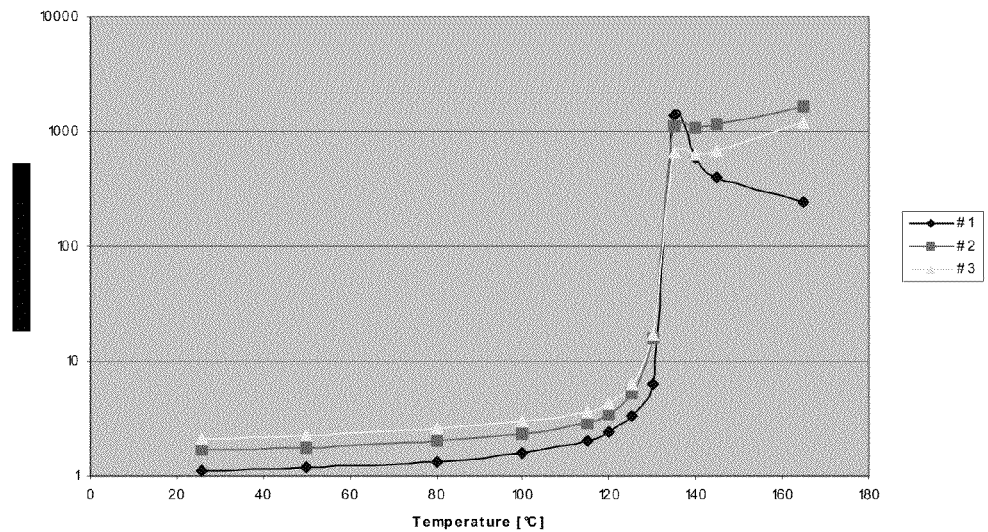
FIG. 2 shows the resistivity as a function of temperature for several embodiments made according to the concepts of the present invention as compared to a prior art PTC material.

Tables 1, 2 and 3 provide an overview of the formulations employed in these examples. As can be seen from Table 1 and FIG. 2 (showing the resistivity as a function of temperature), the addition of small amounts of nylon 6,6 ("PA66" at 7.5 and 15 wt %) virtually eliminated the NTC effect observed in the control example (#1). This is at best illustrated by comparing the $R_{X°C}/R_{23°C}$ PTC amplitudes. After the initial high increase in resistivity (topping at 135° C.) the control example shows a decrease in both resistivty as well as the $R_{X°C}/R_{23°C}$ value with increasing temperature. Conversely, the examples made according to the concepts of the present invention using PA66 show only a minor drop in resistivity and $R_{X°C}/R_{23°C}$ value at 140° C. compared to 135° C. and afterwards the resistivity and $R_{X°C}/R_{23°C}$ value even increases further. At higher PA66 loadings (15 wt %), ductility drops but properties at lower levels of PA66 (7.5 wt %) are well maintained. Based on the current MVR data there seems to be a negative effect on flow.

TABLE 1

| Formulation | Unit | #1 | #2 | #3 |
|---|---|---|---|---|
| Item description | | | | |
| Hostalen GD7255 (Basell) | % | 45 | | |
| EXXELOR MDEX 101-2 (Exxon Mobil) | % | 5 | | |
| Printex G (Degussa) | % | 50 | | |
| Formulation #1 | % | | 92.5 | 85 |
| Polyamide 66 low IV | % | | 7.5 | 15 |
| Total | % | 100 | 100 | 100 |

| Property | Unit | Test Method | #1 | #2 | #3 |
|---|---|---|---|---|---|
| Mechanical | | | | | |
| Tensile Modulus | MPa | ISO 527 | 2471 | 2749 | 2805 |
| Max. Tensile stress | MPa | ISO 527 | 31.06 | 33.04 | 34.12 |
| Yield Strain | % | ISO 527 | 4.24 | 3.41 | |
| Strain at break | % | ISO 527 | 10.44 | 10.02 | 2.6 |
| Izod Unnotched Impact | kJ/m² | ISO 180 | 37 | 35.15 | 13.24 |
| Thermal | | | | | |
| HDT 0.45 MPa | ° C. | ISO 75 | 108 | | 110.43 |
| MVR | | | | | |
| 265° C./10 kg | ml/10 min | ISO 1133 | 1.32 | 0.23 | 0.38 |
| PTC-characteristics* | | | | | |
| Switching temp | ° C. | | 128 | 128 | 128 |
| Resistivity at 23° C. | Ohm · cm | | 1.13 | 1.68 | 2.14 |
| PTC amplitude | | | | | |
| $R_{135°C}/R_{23°C}$ | | | 1202 | 660 | 308 |
| $R_{140°C}/R_{23°C}$ | | | 528 | 635 | 291 |
| $R_{145°C}/R_{23°C}$ | | | 350 | 674 | 316 |
| $R_{165°C}/R_{23°C}$ | | | 218 | 989 | 564 |

Figure 3:
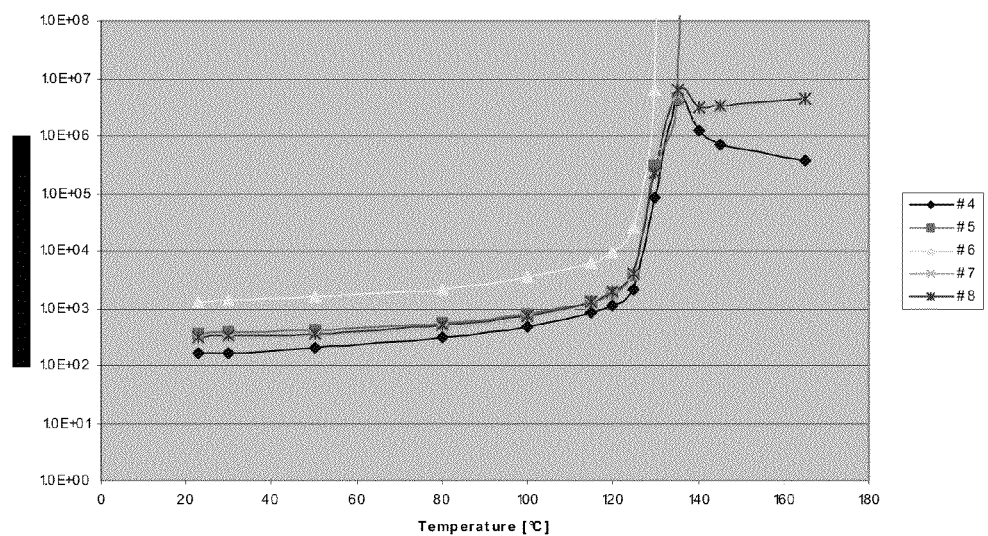
FIG. 3 shows the resistivity as a function of temperature for several embodiments made according to the concepts of the present invention as compared to a prior art PTC material.

As can be seen from Table 2 and FIG. 3 (showing the resistivity as a function of temperature), the addition of small amounts of polybutylene terepthalate (VALOX* 334 resin from SABIC Innovative Plastics) (#5, #6) increases the PTC-effect tremendously and even to such an extend that with our multimeter, the resistance exceeds the upper limit of our multimeter (100 Mega Ohm). Moreover in the temperature range studied (up to 165° C.) the resistivity does not come back to measurable values. Contrary hereto, the reference material not containing the dispersed PBT does show a significant NTC effect (#4). The sharp increase in PTC amplitude for the PBT containing PTC samples with no measurable NTC effect at higher temperatures means that temperature overshoot from over current situations or hooking these materials up to power sources is not possible. The addition of small amounts of PA66 (#7, #8) virtually eliminated the NTC effect observed in the control example (#4). This is at best illustrated by comparing the $R_{X°C}/R_{23°C}$ PTC amplitudes. After the initial high increase in resistivity (topping at 135° C.) the control example shows a decrease in both resistivity as well as the $R_{X°C}/R_{23°C}$ value with increasing temperature. Conversely, the examples made according to the concepts of the present invention using PA66 show only a minor drop in resistivity and $R_{X°C}/R_{23°C}$ value at 140° C. compared to 135° C. and afterwards the resistivity and $R_{X°C}/R_{23°C}$ value even increases further. Compared to example 1, the MVR is maintained at the same level for the PA containing materials whereas a beneficial effect is noted when PBT is used as polymer additive.

TABLE 2

| Fomulation | Unit | #4 | #5 | #6 | #7 | #8 |
|---|---|---|---|---|---|---|
| Item description | | | | | | |
| Hostalen GD7255 (Basell) | % | 45 | | | | |
| Orevac 18921A (Arkema) | % | 5 | | | | |
| Printex G (Degussa) | % | 20 | | | | |
| THERMOCARB TC300 (Asbury) | % | 30 | | | | |
| Formulation #4 | % | | 92.5 | 85 | 92.5 | 85 |
| Valox 334 (Sabic-IP) | % | | 7.5 | 15 | | |
| Polyamide 66 low IV | % | | | | 7.5 | 15 |
| Total | % | 100 | 100 | 100 | 100 | 100 |

| Property | Unit | Test Method | #4 | #5 | #6 | #7 | #8 |
|---|---|---|---|---|---|---|---|
| Mechanical | | | | | | | |
| Tensile Modulus | MPa | ISO 527 | 3216 | 3514 | 3602 | 3549 | 3797 |
| Max. Tensile stress | MPa | ISO 527 | 27.4 | 27.3 | 27.4 | 27.3 | 29.5 |
| Yield Strain | % | ISO 527 | 2.88 | 2.18 | 1.76 | 2.04 | NA |
| Strain at break | % | ISO 527 | 3.8 | 2.7 | 2.1 | 2.4 | 1.9 |
| Izod Unnotched Impact | kJ/m² | ISO 180 | 10.3 | 8.1 | 7.4 | 7.8 | 6.5 |
| Thermal | | | | | | | |
| HDT 0.45 MPa | ° C. | ISO 75 | 108 | 110 | 113 | 113 | 119 |
| MVR | | | | | | | |
| 245° C./10 kg | ml/10 min | ISO1133 | 8.2 | 12.4 | 18.8 | | |
| 265° C./10 kg | ml/10 min | ISO 1133 | | | | 7.7 | 10.3 |
| PTC-characteristics | | | | | | | |
| Switching temp | ° C. | | 123 | 122 | 122 | 124 | 122 |
| Resistivity at 23° C. | Ohm · cm | | 159 | 356 | 1327 | 288 | 307 |
| PTC amplitude | | | | | | | |
| $R_{135°C}/R_{23°C}$ | | | 2.68E+04 | 1.25E+04 | >3.98E+33* | 1.72E+04 | 1.99E+04 |
| $R_{140°C}/R_{23°C}$ | | | 7.62E+03 | >1.47E+34* | >3.98E+33* | 8.05E+03 | 1.01E+04 |
| $R_{145°C}/R_{23°C}$ | | | 4.45E+03 | >1.47E+34* | >3.98E+33* | 9.40E+03 | 1.08E+04 |
| $R_{165°C}/R_{23°C}$ | | | 2.39E+03 | >1.47E+34** | >3.98E+33* | 1.70E+04 | 1.47E+04 |

*Resistance higher as maximum multimeter.
VR > calculated VR based on maximum resistance multimeter.

Figure 4:
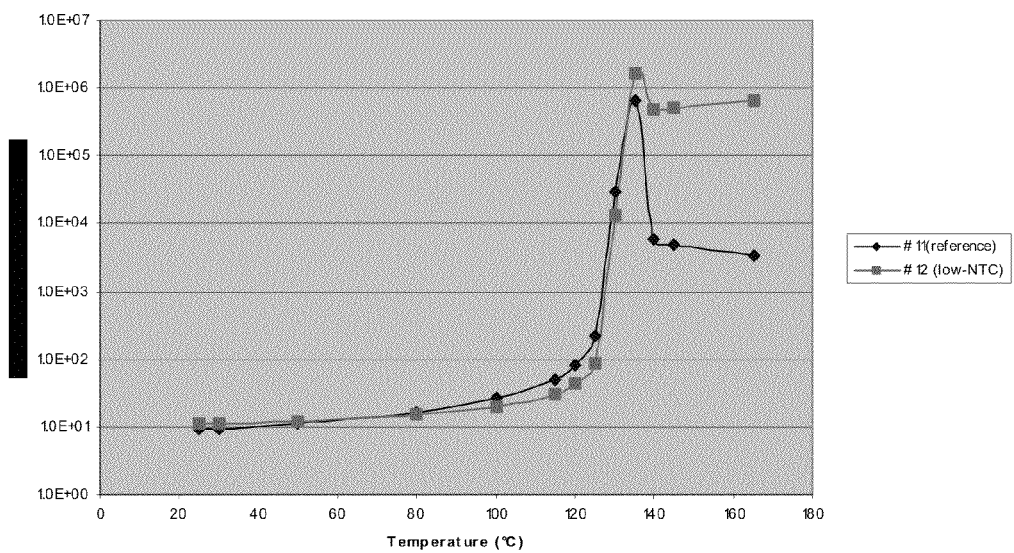
FIG. 4 shows the resistivity as a function of temperature for several embodiments made according to the concepts of the present invention as compared to a prior art PTC material

As can be seen from Table 3 and FIG. 4 (showing the resistivity as a function of temperature), the addition of small amounts of nylon 6 ("PA6" at 7.5 wt %, #12) virtually eliminated the NTC effect observed in the control example (#11). This is at best illustrated by comparing the $R_{X°C}/R_{23°C}$ PTC amplitudes. After the initial high increase in resistivity (topping at 135° C.) the control example shows a decrease in both resistivity as well as the $R_{X°C}/R_{23°C}$ value with increasing temperature. Conversely, the examples made according to the concepts of the present invention using PA6 show only a minor drop in resistivity and $R_{X°C}/R_{23°C}$ value at 140° C. compared to 135° C. and afterwards the resistivity and $R_{X°C}/R_{23°C}$ value even increases further

TABLE 3

| Fomulation | Unit | #9 | #10 | #11 | #12 |
|---|---|---|---|---|---|
| Item description | | | | | |
| Hostalen GC7260 (Basell) | % | 47.5 | | 25 | 14.3 |
| Ethylene acrylate copolymer Elvaloy PT 862 (Dupont) | % | 2.5 | | | |
| Printex G (Degussa) | % | 50 | | | |
| Fusabond MD100 (Dupont) | % | | 30 | | |
| Domamid 24 (PA6) (DOMO) | % | | 70 | | |
| #9 | | | | 50 | 50 |
| #10 | | | | | 10.7 |
| Thermocarb TC300 (Asbury) | % | | | 25 | 25 |
| Total | % | 100 | 100 | 100 | 100 |

| Property | Unit | Test Method | #9 | #10 | #11 | #12 |
|---|---|---|---|---|---|---|
| Mechanical | | | | | | |
| Tensile Modulus | MPa | ISO 527 | | | 3457 | 4104 |
| Max. Tensile stress | MPa | ISO 527 | | | 27.97 | 31.71 |
| Strain at break | % | ISO 527 | | | 2.30 | 1.80 |
| Izod Unnotched Impact | kJ/m$^2$ | ISO 180 | | | 7.78 | 7.45 |
| Thermal | | | | | | |
| HDT 0.45 MPa | °C. | ISO 75 | | | 107.70 | 115.73 |
| MVR | | | | | | |
| 265° C./10 kg | ml/10 min | ISO 1133 | | | 31.41 | 10.41 |
| PTC-characteristics* | | | | | | |
| Switching temp | °C. | | | | 128 | 128 |
| Resistivity at 23° C. | Ohm · cm | | | | 9.06 | 10.97 |
| PTC amplitude | | | | | | |
| $R_{135° C.}/R_{23° C.}$ | | | | | 71750 | 147036 |
| $R_{140° C.}/R_{23° C.}$ | | | | | 659 | 44446 |
| $R_{145° C.}/R_{23° C.}$ | | | | | 538 | 46369 |
| $R_{165° C.}/R_{23° C.}$ | | | | | 362 | 58848 |

While the embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A positive temperature coefficient composition comprising:
   a) from 20 to 90% by weight of a thermoplastic polymer;
   b) from 10 to 60% by weight of at least one conductive filler; and
   c) from 0.1 to 20% by weight of a particulate polymer additive having monomer units of <50,000;
   wherein the polymer additive has a melting or softening temperature greater than the melting temperature of the thermoplastic polymer;
   wherein the particulate polymer additive is dispersed in the positive temperature coefficient composition.

2. The positive temperature coefficient composition of claim 1 wherein the thermoplastic polymer is selected from high-density polyethylene, linear low-density polyethylene, low-density polyethylene, mid-density polyethylene, maleic anhydride functionalized polyethylene, a maleic anhydride functionalized elastomeric ethylene copolymer, an ethylene-butene copolymer, an ethylene-octene copolymer, an ethylene-acrylate copolymer, glycidyl methacrylate modified polyethylene, polypropylene, maleic anhydride functionalized polypropylene, glycidyl methacrylate modified polypropylene, polyvinyl chloride, polyvinyl acetate, polyvinyl acetyl, acrylic resin, syndiotactic polystyrene, polyphenylene-sulfide, polyamideimide, polyimide, polyetheretherketone, polyetherketone, polyethylene vinyl acetate, glycidyl methacrylate modified polyethylene vinyl acetate, polyvinylalcohol, polyisobutylene, poly(vinylidene chloride), poly(vinylidene fluoride), poly(methylacrylate), polyacrylonitrile, polybutadiene, polyesters, polyethylene-terephthalate, polybutylene-terephthalate, poly(8-aminocaprylic acid), poly(vinyl alcohol), polycaprolactone, polyamides or blends or a combination including at least one of the forgoing polymers.

3. The positive temperature coefficient composition of claim 2, wherein the polyamide is selected from PA11, PA12, PA6, PA6.6, PA 6.10, polyphthalamide, high temperature nylon or blends or a combination including at least one of the forgoing polyamides.

4. The positive temperature coefficient composition of claim 1 wherein the conductive filler is selected from a ceramic filler, a metallic filler, a carbon-containing filler or a combination including at least one of the foregoing fillers.

5. The positive temperature coefficient composition of claim 1 wherein the polymer additive comprises a polyamide polymer.

6. The positive temperature coefficient composition of claim 1, wherein the thermoplastic polymer comprises a polyolefin, wherein the conductive filler comprises carbon black and wherein the polymer additive comprises a polyamide.

7. An article of manufacture comprising the composition of claim 1.

8. The positive temperature coefficient composition of claim 1, wherein the composition has a reduced negative temperature coefficient (NTC) effect as compared to a composition without the polymer additive.

9. The positive temperature coefficient composition of claim 1, wherein the composition comprises a compatibilizer.

10. A method of making a positive temperature coefficient composition comprising the steps of:
   a) mixing from 10 to 60% by weight of at least one conductive filler with from 20 to 90% by weight of a thermoplastic polymer; and
   b) dispersing from 0.1 to 20% by weight of a particulate polymer additive having monomer units of <50,000 into the positive temperature coefficient composition;
   wherein the polymer additive has a softening or melting temperature greater than the melting temperature of the thermoplastic polymer; and
   wherein the dispersed polymer additive is present substantially in particle form in the positive temperature coefficient composition.

11. The method of claim 10, wherein the thermoplastic polymer comprises a polyolefin, wherein the conductive filler comprises carbon black and wherein the polymer additive comprises a polyamide.

12. The method of claim 10, wherein the composition is injection moldable.

13. The method of claim 10, comprising mixing a compatibilizer with the conductive filler and the thermoplastic polymer in step (a).

* * * * *